United States Patent [19]

Arzet

[11] 4,134,269

[45] Jan. 16, 1979

[54] LAWN WATERING SYSTEM

[76] Inventor: Frederick R. Arzet, 2136 Plymouth La., Marietta, Ga. 30062

[21] Appl. No.: 848,029

[22] Filed: Nov. 3, 1977

[51] Int. Cl.² .............................................. E02B 13/00
[52] U.S. Cl. ........................................ 405/37; 62/93; 62/244
[58] Field of Search .................... 61/13, 12, 11, 10; 62/93, 389, 244

[56] References Cited

U.S. PATENT DOCUMENTS

| 1,231,308 | 6/1917 | Steelquist | 61/13 |
| 2,499,982 | 3/1950 | Suiter | 62/93 X |
| 2,509,605 | 5/1950 | McIntyre | 61/13 |
| 4,034,571 | 7/1977 | Bollinger | 62/389 X |

*Primary Examiner*—Jacob Shapiro
*Attorney, Agent, or Firm*—Jones, Thomas & Askew

[57] ABSTRACT

A lawn watering system utilizes water formed by condensation taken out of the air by an air conditioning system. The water is stored in a holding tank and at a predetermined level in the tank, a pump is switched on for delivering the water to a hose system in the lawn.

2 Claims, 1 Drawing Figure

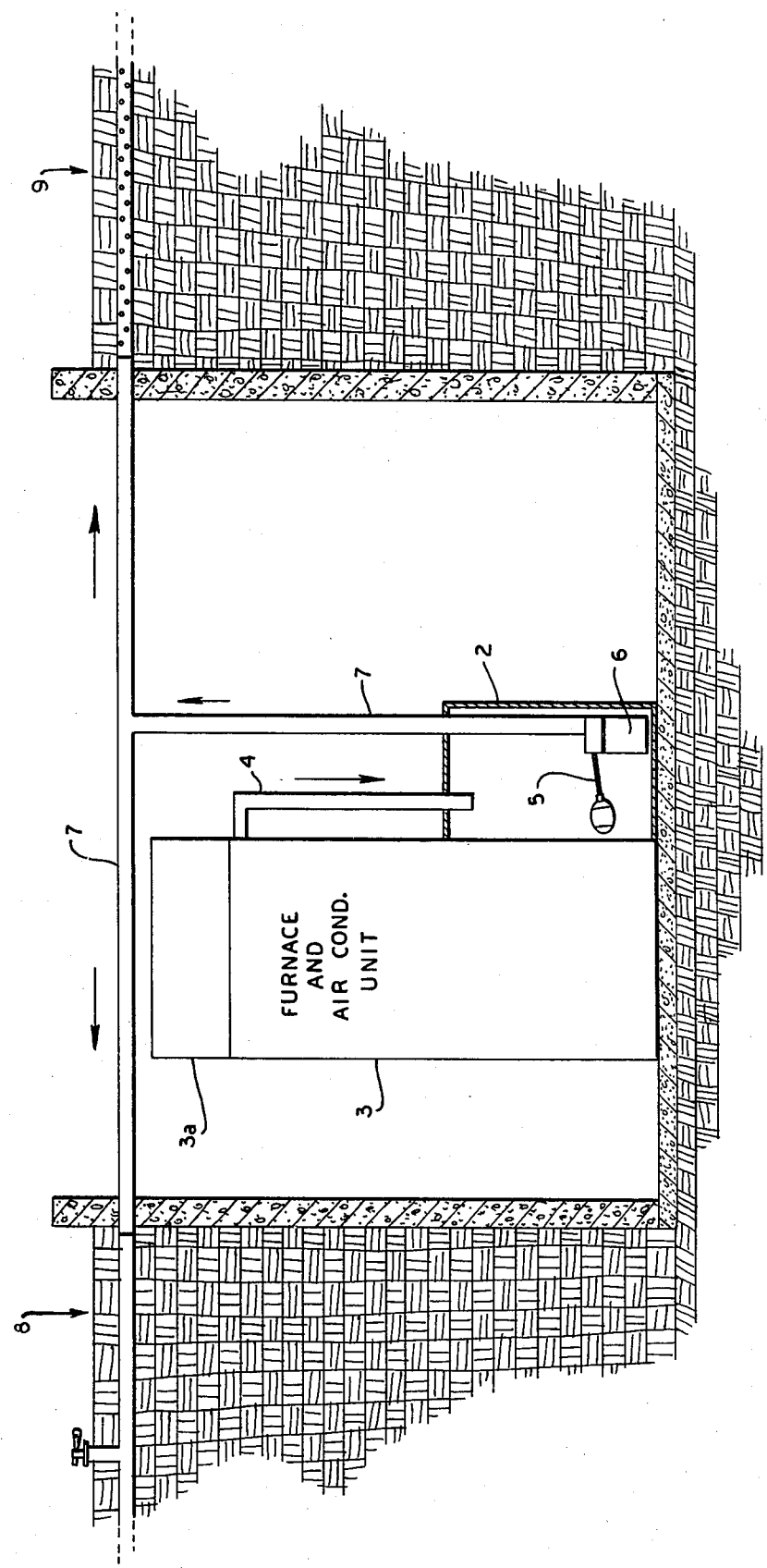

LAWN WATERING SYSTEM

BACKGROUND OF THE INVENTION

During times of inadequate rainfall, many areas of this country are forced to prohibit the watering of lawns, which often results in much of the lawn drying and needing to be dug up and replanted. At the same time, many of the homes and other buildings in these areas of insufficient rainfall are continually cooled by air conditioning systems. These air conditioning systems typically remove moisture from the air to reduce excessive humidity, and a typical central air conditioning system for an average home may remove many gallons of moisture from the air during a 24-hour period. Until now, the so-called "condensate", that is, the water formed by condensation within such air conditioning systems, has simply been drained away as waste.

SUMMARY OF THE INVENTION

The present invention makes use of the previously wasted condensate of air conditioning systems. This is done by collecting the condensate into a holding tank and, once the holding tank has acquired a predetermined amount of water, dispensing the water throughout the lawn or other region to be irrigated.

It is therefore an object of this invention to take useful advantage of a previously wasted supply of water to aid in the watering of lawns or other regions to be irrigated.

This and other objects of the invention will become apparent from reference to the following description, attached drawing and appended claims.

BRIEF DESCRIPTION OF THE DRAWING

The drawing is a schematic diagram showing a lawn watering system according to a disclosed preferred embodiment of the present invention.

DETAILED DESCRIPTION

The lawn watering system 1 includes a water holding tank 2 which receives and stores water from a building air conditioning unit 3a which is mounted on top of the furnace 3. The conventional condensate drainage pipe 4 from the air conditioning unit 3 is connected to a water holding tank 2, rather than simply going to a waste drain as in air conditioning systems of the prior art. A water pump 6, which may be mounted either internally or externally of the holding tank 2, has an inlet which communicates with the interior of the holding tank and an outlet which is connected to the discharge line 7. A depth sensor 5, which is depicted in the disclosed embodiment as a floating ball and which will be understood to activate an electrical switch in the control circuit of the pump 6, determines the depth of the water in the tank 2. This depth sensor 5 is in communication with the pump 6 and upon the water in the tank 2 reaching a predetermined maximum depth, the depth sensor 5 turns on the water pump 6 and after the water reaches a predetermined minimum depth, the sensor turns the pump off.

The present apparatus operates in the following manner: Condensation from the air conditioning unit 3 drains continually from the drainage pipe 4 into the water holding tank 2 and gradually increases the water level within the holding tank 2. Upon reaching a certain depth, the water triggers the depth sensor 5, which turns on the water pump 6. The water pump 6 pumps water from the holding tank through the discharge line 7 and into yard hose watering system 8, 9 by which it is dispensed throughout the yard. The yard hose watering system could be any conventional type such as sprinklers 8 or seepage lines 9, either subsurface or aboveground.

It is contemplated by the present invention that the automatic watering system can be supplemented with other sources of water. This can be done by hooking a steady water supply to the discharge lines 7 and thereby manually controlling the discharge of water to the yard. Or else, water sources such as rain water, slow running faucets, etc. can be drained directly into the holding tank 2 and, thereby, be automatically and intermittently dispensed through the yard by operation of the sensor device 5 and pump 6 as previously described.

The depicted location of the holding tank 2 is not to be considered essential, and it may be appropriate in some applications to place the holding tank underground or at some other location which is remote from the air conditioning unit 3. The holding tank 2 preferably should be sufficiently large, e.g. 100 gallons or more, to contain a substantial volume of condensate.

While this invention has been described in detail with particular reference to a preferred embodiment thereof, it will be understood that variations and modifications can be effected within the spirit and scope of the invention as described hereinbefore and as defined in the appended claims.

What is claimed is:

1. In combination with a domestic central air conditioning unit, which is used to cool a home or other building, and like air directing units which during the course of their operation produce a quantity of waste condensate, apparatus for continually collecting and storing said waste condensate and for intermittently automatically distributing said condensate throughout a region to be irrigated, said apparatus comprising a holding tank for collecting said waste condensate and a drainage conduit for directing said waste condensate from said air conditioning unit to said holding tank, a depth sensing device for indicating the level of said waste condensate collected in said tank, a pump means responsive to said depth sensing device for pumping said waste condensate collected in said holding tank from said holding tank, said pump means being automatically turned on by said depth sensing device to pump collected waste condensate from said holding tank when said depth sensing device indicates that the level of condensate in said tank has reached a predetermined maximum and automatically turned off by said depth sensing device when said depth sensing device indicates that the level of condensate in said tank has reached a predetermined minimum thus allowing said condensate to refill said tank to said predetermined maximum level, and a discharge conduit associated with said pump means and including irrigation means for directing said waste condensate from said holding tank throughout said region to be irrigated.

2. Method for utilizing the waste condensate produced by a domestic central air conditioning unit used to cool a home or other building, so as to irrigate an area of lawn or like region to be irrigated, said method comprising the steps of:

directing the waste condensate from the air conditioning unit to a holding tank;

sensing the depth of the waste condensate rising in the holding tank;

turning on a pump and pumping waste condensate from the holding tank in response to the condensate achieving a predetermined maximum depth within the holding tank; and directing the waste condensate being pumped from the holding tank through an irrigation system and subsequently throughout the region to be irrigated.

* * * * *